United States Patent [19]
Walch et al.

[11] Patent Number: 5,417,042
[45] Date of Patent: May 23, 1995

[54] FARM MACHINE WITH IMPROVED LOAD-LIGHTENING AND LIFTING DEVICE

[75] Inventors: Martin Walch, Dettwiller; Bernard Wattron, Haegen, both of France

[73] Assignee: Kuhn, S.A., Saverne Cedex, France

[21] Appl. No.: 61,365

[22] Filed: May 14, 1993

[30] Foreign Application Priority Data

May 14, 1992 [FR] France ................. 92 06018

[51] Int. Cl.⁶ ..................... A01D 34/66; A01D 75/14
[52] U.S. Cl. ........................... 56/6; 56/15.2; 56/15.5; 56/15.9; 56/DIG. 14
[58] Field of Search ............ 56/6, 7, 15.1, 15.2, 56/15.5, 15.7, 15.9, DIG. 9, DIG. 11, DIG. 14

[56] References Cited

U.S. PATENT DOCUMENTS

| | | | |
|---|---|---|---|
| 2,822,654 | 2/1958 | Elfas et al. | 56/15.7 X |
| 4,723,396 | 2/1988 | Ermacora | 56/15.2 X |

FOREIGN PATENT DOCUMENTS

| | | |
|---|---|---|
| 0304618 | 3/1989 | European Pat. Off. . |
| 0495210 | 7/1992 | European Pat. Off. . |
| 1319825 | 12/1963 | France . |
| 2372352 | 6/1978 | France . |
| 2485322 | 12/1981 | France . |
| 2614755 | 11/1988 | France . |
| 2038744 | 2/1972 | Germany . |
| 3139936 | 4/1983 | Germany . |
| 9005599.3 | 10/1990 | Germany . |
| 8907918.3 | 12/1990 | Germany . |

Primary Examiner—Terry Lee Melius
Attorney, Agent, or Firm—Oblon, Spivak, McClelland, Maier & Neustadt

[57] ABSTRACT

A farm machine and particularly a mower or harvester, which includes a load-lightening and lifting device having an elastically deformable element mounted parallel with a jack or lift cylinder. According to the invention, the farm machine includes a piston which is separated from a rod of the jack and the rod includes a stop against which the piston is intended to come to rest, such that in a first mode of operation (during work), the rod can slide in the cylinder without a stop of the rod touching the piston, which allows a normal operation of an elastically deformable element. In addition, in a second mode of operation (during transport), the piston is brought into contact with the stop of the rod under the action of the fluid of a feed source, to displace the rod in relation to the cylinder.

51 Claims, 9 Drawing Sheets

FARM MACHINE WITH IMPROVED LOAD-LIGHTENING AND LIFTING DEVICE

BACKGROUND OF THE INVENTION

1. Field of the Invention

The invention relates to farm machines such as mowers or harvesters. In particular, the present invention provides an improved load-lightening and lifting device which includes a jack or lift cylinder arrangement mounted parallel with an elastically deformable element. The jack includes a cylinder; a rod guided in the cylinder and coming out or extending from the cylinder; and a piston mounted to slide in the cylinder and which separates the cylinder into two distinct chambers, at least one of which is intended to be fed with fluid from a feed source to translate the piston in the cylinder.

2. Discussion of Background

DE-31 39 936 shows a farm machine which rests on the ground by two wheels. The two wheels are connected to the frame of the machine by two wheel arms fastened to a pivoting shaft. The pivoting shaft is connected to the frame to allow a simultaneous pivoting of the wheel arms around the geometric axis of the pivoting shaft.

This known machine also includes a jack or lift cylinder arrangement and a helical compression spring. The jack is installed between the frame and a first lever connected rigidly to the pivoting shaft, to pivot the wheel arms downward, and move the frame away from the ground. So that the jack does not prevent, during work, a displacement in height of the frame in relation to the wheels, an operational play between the rod of the jack and the first lever is provided. This operational play allows a slight pivoting of the first lever, and therefore of the wheel arms in relation to the frame. In addition, a second lever is connected to the first lever by a hinge directed parallel to the pivoting shaft of the wheel arms. Furthermore, the helical spring extends between this second lever and the frame. Under the action of this helical spring, the second lever rests on one of the wheel arms to lighten the frame during work.

Since this known machine comprises a spring mounted parallel with a jack, the space requirement with respect to the length of the spring-jack unit is relatively small. Moreover, in a first mode of operation, the helical spring lightens the frame, whereas the action of the jack is cancelled, while in a second mode of operation, the frame is brought into a raised position by the jack.

However, this known machine exhibits certain drawbacks.

With regard to the operational play that is provided between the jack and the first lever, the connection between the jack and the first lever is relatively complex. Furthermore, taking into account the environment in which work is generally performed with this type of farm machine, the operational play of this connection runs the risk of being quickly obstructed or hindered by deposits and debris, which would interfere with good load-lightening of the machine. In addition, the use of a second lever upon which the spring acts is also relatively complex.

SUMMARY OF THE INVENTION

This invention has as its object to provide a farm machine which includes a better parallel mounting of the jack (or lift cylinder) with an elastically deformable element.

For this purpose, the present invention provides a piston which is separated from the rod of the jack, with the rod including a stop against which the piston is intended to come to rest. With this arrangement, in a first mode of operation, the rod can slide in the cylinder without the stop of the rod touching the piston, which allows for normal operation of the elastically deformable element. In addition, in a second mode of operation, the piston is brought into contact with the stop of the rod, under the action of the fluid of the feed source, to displace the rod in relation to the cylinder.

Since it is not necessary to have several levers connected to one another, the mounting of the load-lightening and lifting device on the remainder of the farm machine is relatively simple and easy.

Further, the displacement of the rod of the jack in the first mode of operation does not bring about, or brings about very little, variation of the volume of fluid contained in the chambers of the jack. The farm machine according to the invention therefore does not exhibit the drawback of drawing in or expelling large amounts of fluid (generally of liquid) through at least one feed duct.

So that no fluid is drawn in or expelled in the first mode of operation, in accordance with the present invention, it is also provided that the rod of the jack goes through the piston and comes out on both sides of the cylinder. Actually, the translation of the rod in the cylinder under the action of the elastically deformable element thus in no way modifies the volume of the two chambers of the jack.

During the passage or transition from the first mode of operation to the second mode of operation, a gradual contact is obtained between the piston and the stop of the rod, with the piston exhibiting a cavity intended to assume the shape of the stop. As a result, the flow of the fluid between the piston and the stop assures a gradual contact between these two elements.

In a similar manner, it is provided that at the end of travel, the piston brings the stop of the rod against a longitudinal end of the cylinder which exhibits a cavity intended to assume the shape of the stop, in order to obtain a gradual contact between the stop and the cylinder. The passage from the first mode of operation to the second mode of operation is thus performed without shocks.

According to an additional aspect of the invention, it is also provided that the jack is a double-action jack whose two chambers are intended to be fed with fluid from the feed source. As a result, the piston can be brought back quickly into its initial position for the first mode of operation.

Advantageously, it is also provided that the stop is a collar making it possible to dampen sliding of the rod in the cylinder. This is particularly advantageous in the first mode of operation, where the damping of the collar which is translated in the fluid is combined with the action of the elastically deformable element. The elastically deformable element can be, for example, a compression spring.

Further, according to a particularly advantageous aspect of the invention, the elastically deformable element includes a gas spring. In this case, the gas spring advantageously includes an elastically deformable jacket and two flanges each installed at a longitudinal end of the elastically deformable jacket. Further, to limit the lateral deformation of the deformable jacket and to urge the jacket to a greater longitudinal deformation, the gas spring additionally includes a lateral stiffening element which surrounds the elastically deformable jacket. The gas spring also includes a valve through which the gas spring can be inflated to the desired pressure. It is further preferable that the gas spring is an air spring. According to a further aspect, the elastically deformable element is installed between the rod and the cylinder of the jack.

In the embodiments where the elastically deformable element is a gas spring, which includes an elastically deformable jacket and two flanges, an advantageous embodiment is further obtained when one of the flanges is connected to the rod and the other to the cylinder. In this case, to prevent the risk of fluid from the feed source leaking into the gas spring, it is provided that the load-lightening and lifting device includes a safety device. For this purpose, the load-lightening and lifting device can include a guide ring associated with the rod, with the guide ring installed between the fluid of the feed source and the gas of the gas spring. This guide ring includes, at the level of the rod, two successive seals, between which an orifice is installed, making it possible for the fluid from the feed source to escape in the case of leakage from the corresponding seal. The orifice can communicate, for example, with the atmospheric pressure.

Moreover, it is provided in accordance with another object and aspect of the invention that the safety device includes a safety element fastened in a fluidtight manner at one of its ends to the guide ring and extending between the gas spring and the jack to safely evacuate the fluid during a leak.

According to the invention, it is also provided that the feeding of the chamber of the jack located at the level of the gas spring is performed by a duct provided inside the rod of the jack and coming out at the level of the stop. The duct can advantageously begin at the level of the flange to which the rod is fastened.

According to a highly advantageous aspect of the invention, it is provided that the elastically deformable element is installed on the jack in an at least approximately coaxial manner, to form a single element exhibiting only two mounting points. By virtue of this arrangement, the elastically deformable element is guided on the jack. In the case where the elastically deformable element and the jack form a single load-lightening and lifting element with two mounting points, it is further provided that at least one of the mounting points includes an elastic connection to absorb the possible vibrations and to assure a quieter operation of the farm machine according to the invention. Preferably, the two mounting points each include an elastic connection.

According to a still further advantageous aspect, it is provided that the farm machine according to the invention is adapted to be connected to a power-driven vehicle and that the power-driven vehicle comprises said feed source. The feed source can feed the jack(s) with liquid.

Further, in a particularly advantageous embodiment, it is provided that the farm machine according to the invention is a cutting machine. The present invention is particularly advantageous in the context of a cutting machine which includes:

- a hitching structure intended to be connected to the hitching of a power-driven vehicle;
- a cutting mechanism extending, during work, crosswise to the direction of work;
- a first connection device connecting the cutting mechanism to the hitching structure, with the first connection device being connected to the cutting mechanism at least approximately in the vicinity of a first longitudinal end of the cutting mechanism and allowing the pivoting of the cutting mechanism in relation to the hitching structure around a geometric axis directed forward, as well as a displacement in height of the cutting mechanism in relation to the hitching structure;
- a wheel placed in the vicinity of the second longitudinal end of the cutting mechanism which rolls over the ground during work, while being able to pivot around a geometric axis directed upward;
- a second connection device connecting the wheel to the cutting mechanism, the second connection device being connected to the cutting mechanism at least approximately in the vicinity of the second longitudinal end of the cutting mechanism and allowing a displacement in height of the cutting mechanism in relation to the wheel; and
- two load-lightening and lifting devices, each associated with a connection device, so that in the first mode of operation, namely during work, the cutting mechanism is lightened and further, in the second mode of operation, the cutting mechanism extends at least approximately parallel above the ground.

A particularly advantageous embodiment is obtained when the farm machine according to the invention is a mower or harvester with or without elements for processing the cut product.

BRIEF DESCRIPTION OF THE DRAWINGS

Other objects, advantages and characteristics of the invention will become apparent in the following description of two nonlimiting examples of embodiments of the invention, particularly with reference to the accompanying drawings in which.

DESCRIPTION OF THE PREFERRED EMBODIMENTS

Figure 1:
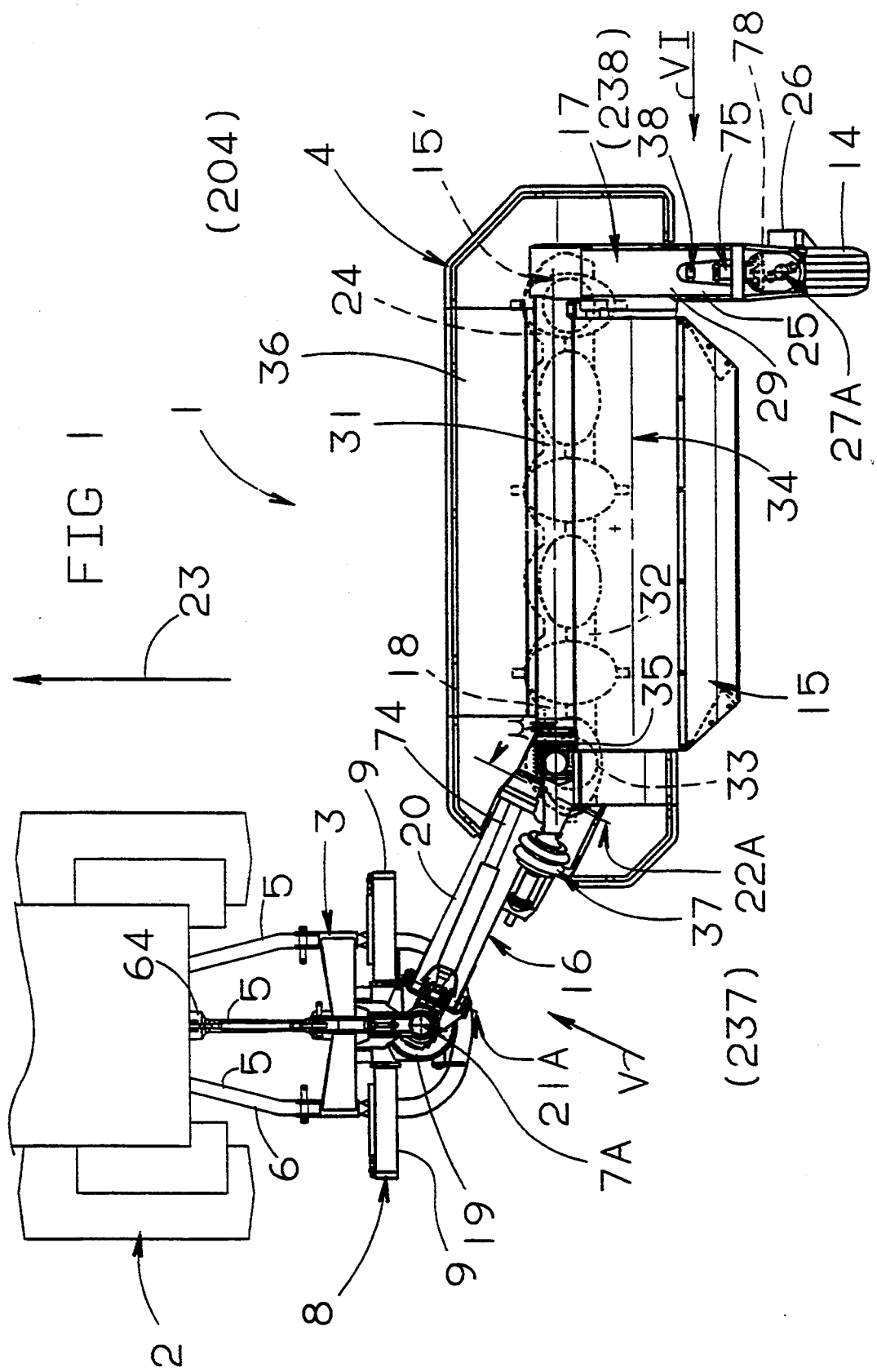
FIG. 1 represents a top view of a farm machine according to the invention connected to a farm tractor and disposed the work position.

Referring now to the drawings wherein like reference numerals designate identical or corresponding parts throughout the several views, FIGS. 1 to 9 represent a mower 1 according to the invention. The mower or harvester is hitched to a farm tractor 2.

Mower 1 is composed mainly of a hitching structure 3 and a body 4. The hitching structure 3 is intended to be connected, at its front part, to three points 5 of a lifting device 6 of the tractor 2. The body 4 is connected to hitching structure 3 by a cylindrical hinge 7 (FIG. 3) with a geometric axis 7A that is at least approximately vertical. The angular position of body 4 in relation to hitching structure 3 can be modified by causing body 4 to pivot around the geometric axis 7A. The attainment of a desired angular position is performed under the action of an operating cylinder arrangement or actuating cylinder 8 which includes two cylinders 9 fastened to hitching structure 3. The two cylinders 9 are at least approximately identical and extend horizontally as extensions of one another. On the inside of each cylinder 9 of actuating cylinder 8, a piston 10 (FIG. 2) is provided which is mounted to slide in the cylinder 9. Between the two pistons 10 a rack 11 is installed which is guided by a guiding part 12 placed on the back of said rack 11. In this way, rack 11 can only be translated in the cylinders 9 under the action of the oil that feeds one of the longitudinal ends of the actuating cylinder 8, to mesh with a toothed sector 13 which is centered on geometric axis 7A and integral with body 4 of mower 1 (FIG. 3).

Figure 2:
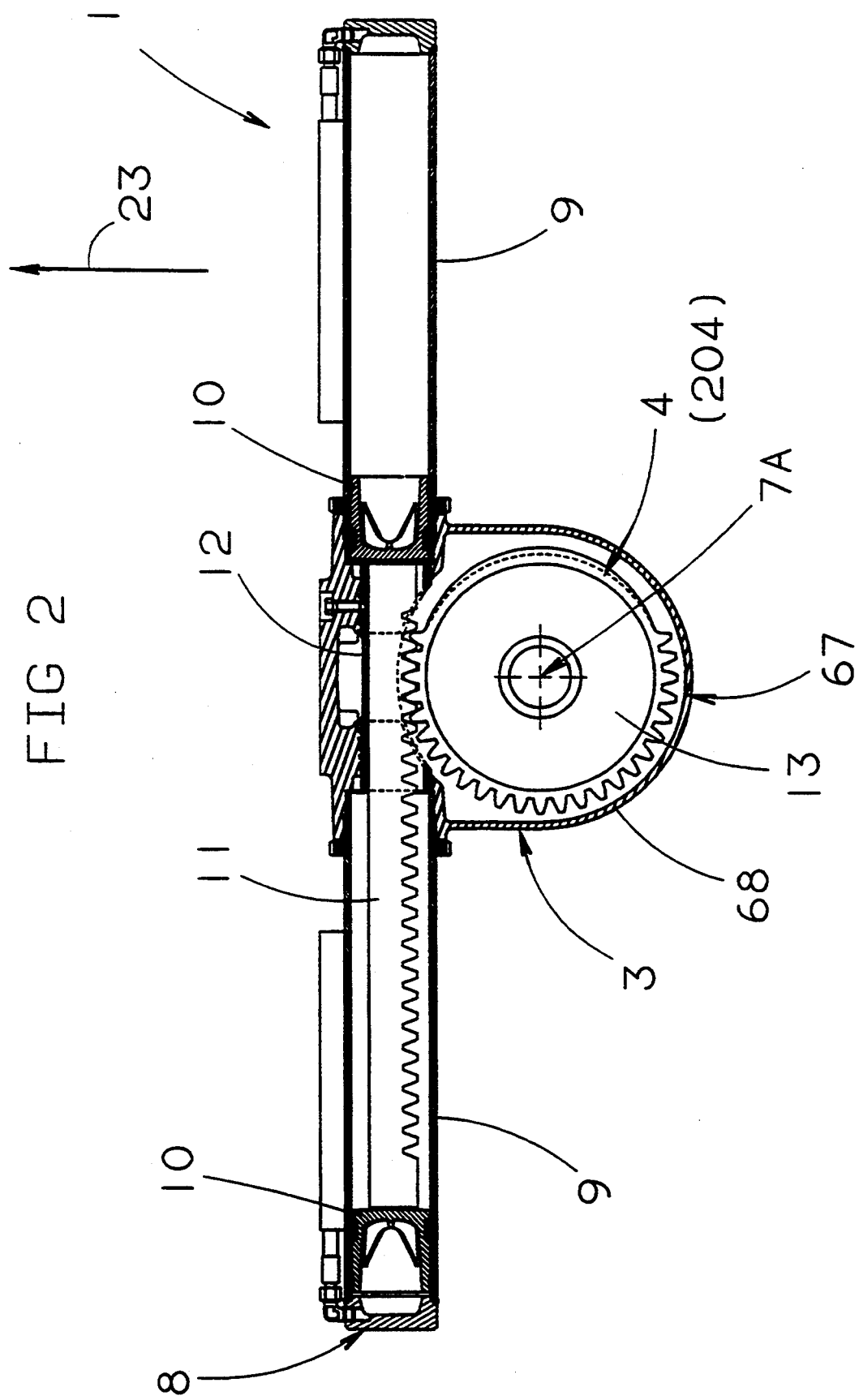
FIG. 2 represents, in the work position of FIG. 1, a section of an actuating element of the hitching structure showing a rack which meshes with a toothed sector.

By virtue of this arrangement, body 4 can be pivoted around the geometric axis 7A under the action of actuating cylinder 8, to be brought from its transport position 104, where it extends at least approximately in the path of tractor 2 (FIGS. 3 and 4), into a work position 204, where it extends at least approximately next to the path of tractor 2 (FIGS. 1 and 2). When body 4 is in its work position 204, the oil is prevented from flowing out of actuating cylinder 8, which has the effect of blocking the pivoting of the body 4 around geometric axis 7A. Conversely, during transport, the two outside chambers of actuating cylinder 8 are placed in communication to allow a free pivoting of body 4 around geometric axis 7A. Consequently, the handling operations during the transport of mower 1 are considerably simplified.

Body 4 of mower 1 rests on the ground by a single wheel 14 installed at the longitudinal end of body 4 far from hitching structure 3. Body 4 includes primarily a harvesting mechanism 15 and two connection devices 16, 17.

Figure 3:
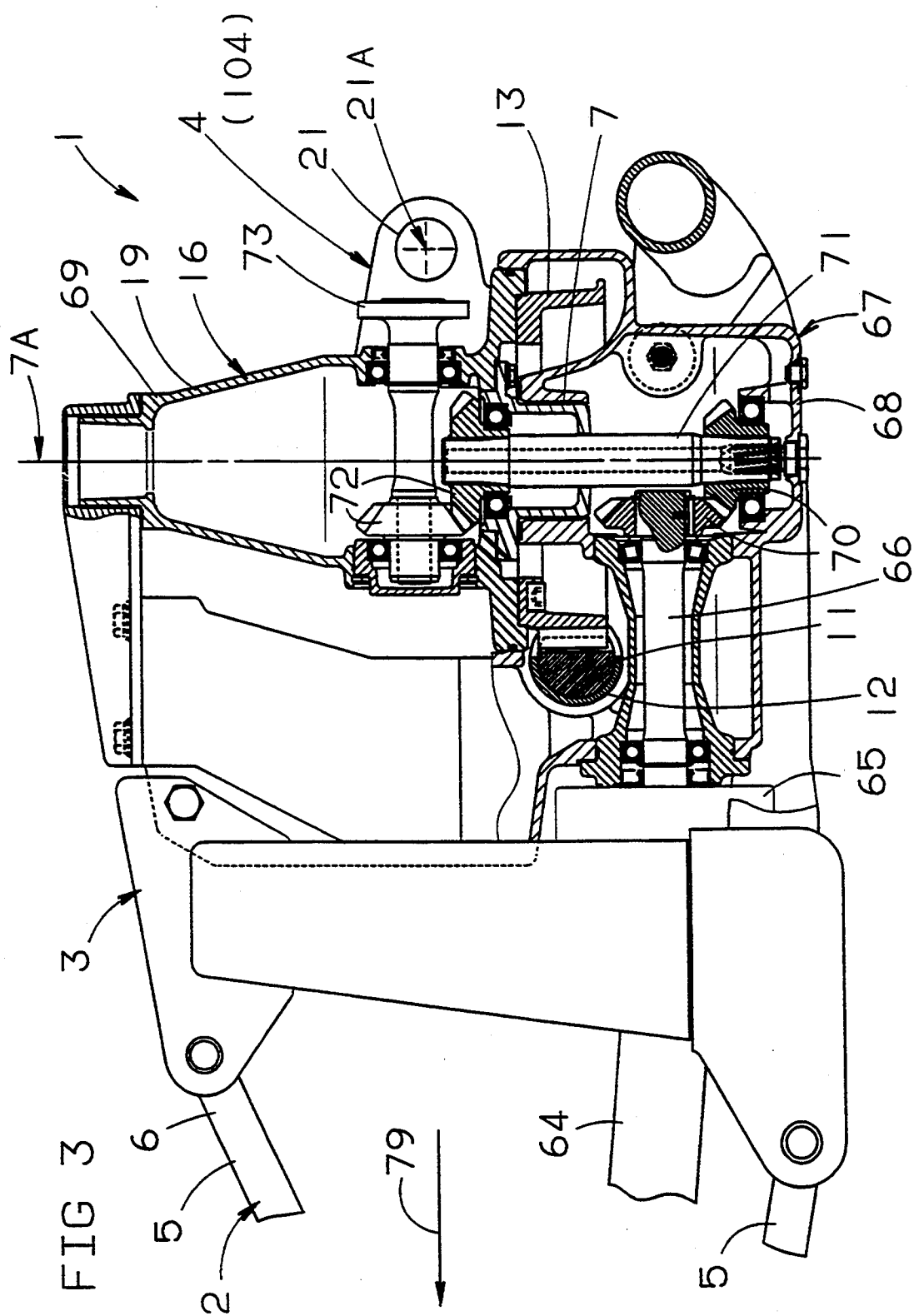
FIG. 3 represents, in the transport position, a partial section of the hitching structure and a part of the first connection device.
Figure 5:
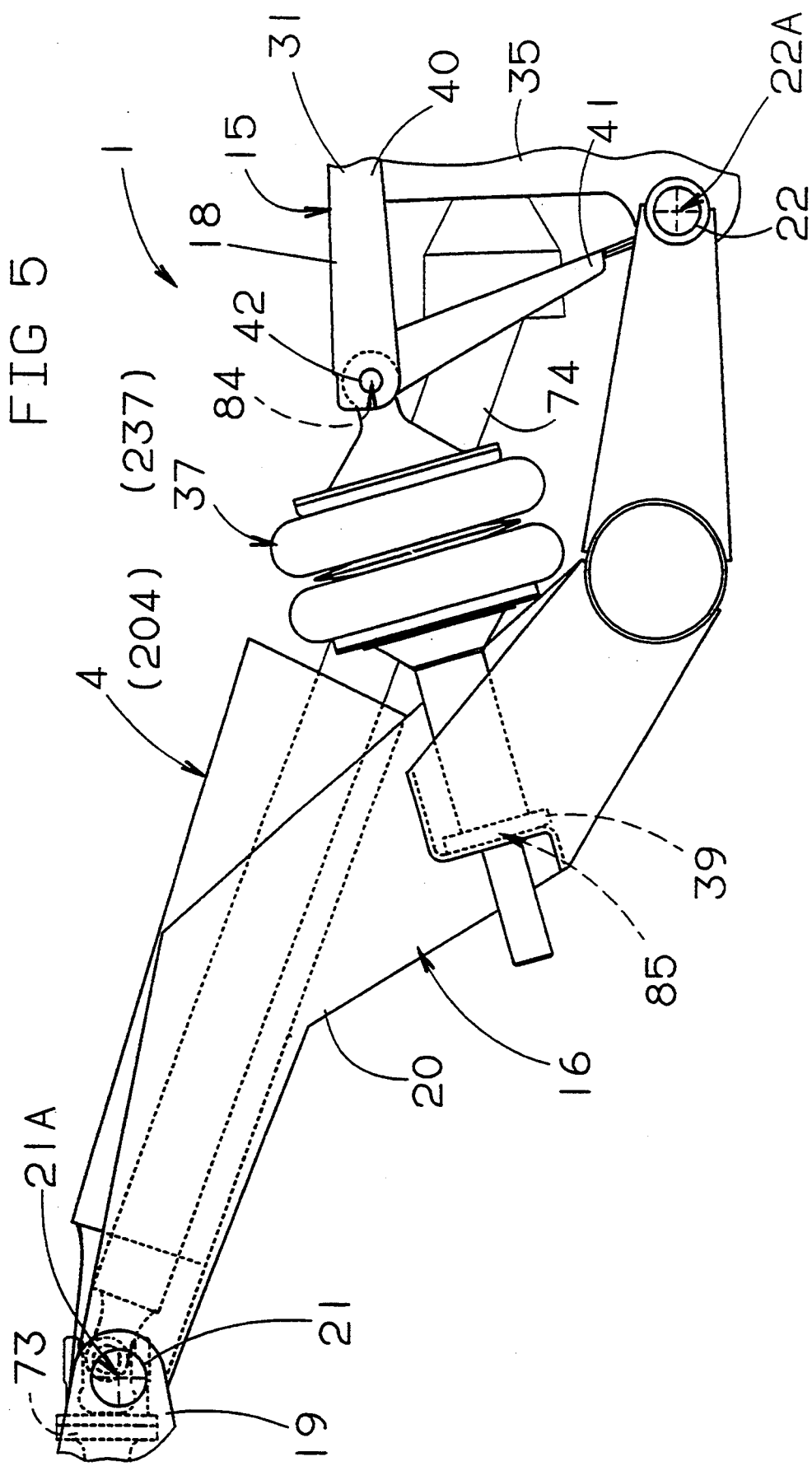
FIG. 5 represents a rear side view of the farm machine without protective elements, along arrow V defined in FIG. 1.

The first connection device 16, which is shown in detail in FIGS. 3 and 5, connects a first longitudinal end 18 of harvesting mechanism 15 to hitching structure 3. For this purpose, the first connection device 16 is composed of a hitching head 19 mounted to pivot around geometric axis 7A of hitching structure 3, and of an oscillating arm 20 connecting harvesting mechanism 15 to the hitching head 19. By virtue of this oscillating arm 20, the first longitudinal end 18 can be considerably displaced in height in relation to the hitching structure 3 to adapt to the contour of the ground. This oscillating arm 20 is more specifically connected at one of its ends to hitching head 19 by a first pivot connection 21. Geometric axis 21A of first pivot connection 21 extends at least approximately at right angles to the longitudinal axis of oscillating arm 20 and to the geometric axis 7A. At its other end, oscillating arm 20 is connected to the harvesting mechanism 15 by a second pivot connection 22 with a geometric axis 22A at least approximately parallel to geometric axis 21A of first pivot connection 21. Moreover, geometric axis 22A of the second pivot connection 22 extends, seen in direction of work 23, at least approximately at half the height of harvesting mechanism 15 and forms, in top view, an angle $\mu$ 60° of about with respect to a longitudinal axis 15' of the harvesting mechanism 15.

The second connection device 17 (FIG. 6) connects a second longitudinal end 24 of the harvesting mechanism 15 to a wheel 14. This second connection device 17 is composed of a deformable quadrilateral 25 and an element 26 for guiding wheel 14. Deformable quadrilateral 25 extends, in top view, at least approximately at right angles to longitudinal axis 15' of harvesting mechanism 15 and element 26 for guiding wheel 14 is connected to the deformable quadrilateral 25 by a cylindrical hinge 27 having a geometric axis 27A that is at least approximately vertical. By virtue of this arrangement, the second longitudinal end 24 of harvesting mechanism 15 can easily be displaced in height in relation to wheel 14, to adapt to the contour of the ground, while allowing the pivoting of element 26 for guiding wheel 14. Deformable quadrilateral 25 comprises a bracket 28, at the upper part of which element 26 for guiding wheel 14 is hinged, and which is connected to harvesting mechanism 15 by two connecting rods 29, 30. This deformable quadrilateral 25 has at least approximately the shape of a parallelogram whose side indicated by bracket 28 extends upward and backward in relation to the direction of work 23, so as to make a space for wheel 14. Advantageously, geometric axis 27A and rolling axis 14A of wheel 14 are approximately concurrent.

Figure 4:
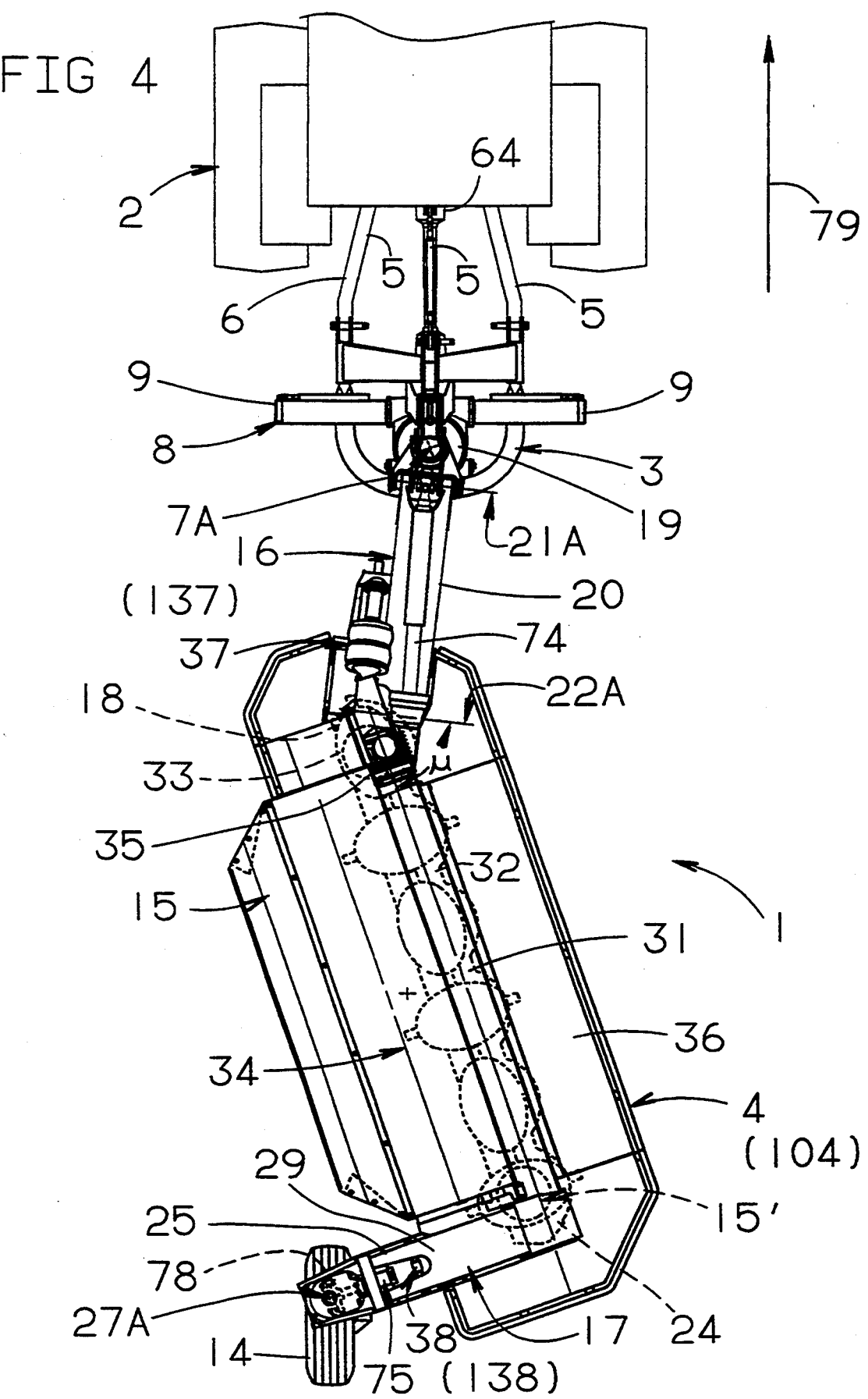
FIG. 4 represents a top view of the farm machine placed in the transport position.

The harvesting mechanism 15 extends between two connection devices 16, 17. Harvesting mechanism 15 includes a carrying structure 31 to which two connection devices 16, 17 are connected. This carrying structure 31 supports a cutting bar 32 equipped with cutting elements 33, and a processing rotor 34 (of which only the axis of rotation is represented in FIGS. 1 and 4) intended to process the product cut by said cutting elements 33. Carrying structure 31 extends at least approximately perpendicular to the direction of work 23 and includes an input housing 35 that is used for driving cutting elements 33 and processing rotor 34. Input housing 35 is installed in the vicinity of second pivot connection 22 connecting first connection device 16 to harvesting mechanism 15. Furthermore, harvesting mechanism 15 also comprises protective elements 36 which extend around cutting bar 32 and processing rotor 34.

The load-lightening of harvesting mechanism 15 is performed by two load-lightening and lifting elements 37, 38, each associated with a corresponding connection device 16, 17. The first load-lightening and lifting element 37 is installed between oscillating arm 20 of first connection device 16 and carrying structure 31 of harvesting mechanism 15. As can be seen in FIG. 5, the first load-lightening and lifting element 37 is connected, on the one hand, at least approximately to the middle of oscillating arm 20 with an elastic joint 39 and, on the other hand, to input housing 35 of carrying structure 31 by two arms 40, 41. These two arms 40, 41 form, with input housing 35, a very rigid triangulation to which first load-lightening and lifting device 37 is connected with an elastic ring 42 of the "silentbloc" type. By virtue of this elastic joint 39 and elastic ring 42, load-lightening and lifting element 37 is easily mounted and operates silently. In addition, the vibrations are damped.

The second load-lightening and lifting element 38 (FIG. 6) extends between the lower part of bracket 28 of deformable quadrilateral 25 and upper connecting rod 29 of the deformable quadrilateral 25. Here too, load-lightening and lifting element 38 is connected to deformable quadrilateral 25 by an elastic joint 43 and an elastic ring 44° Taking into account their arrangement, the two load-lightening and lifting elements 37, 38 assure, during work, the load-lightening of longitudinal ends 18, 24 of harvesting mechanism 15.

Figure 7:
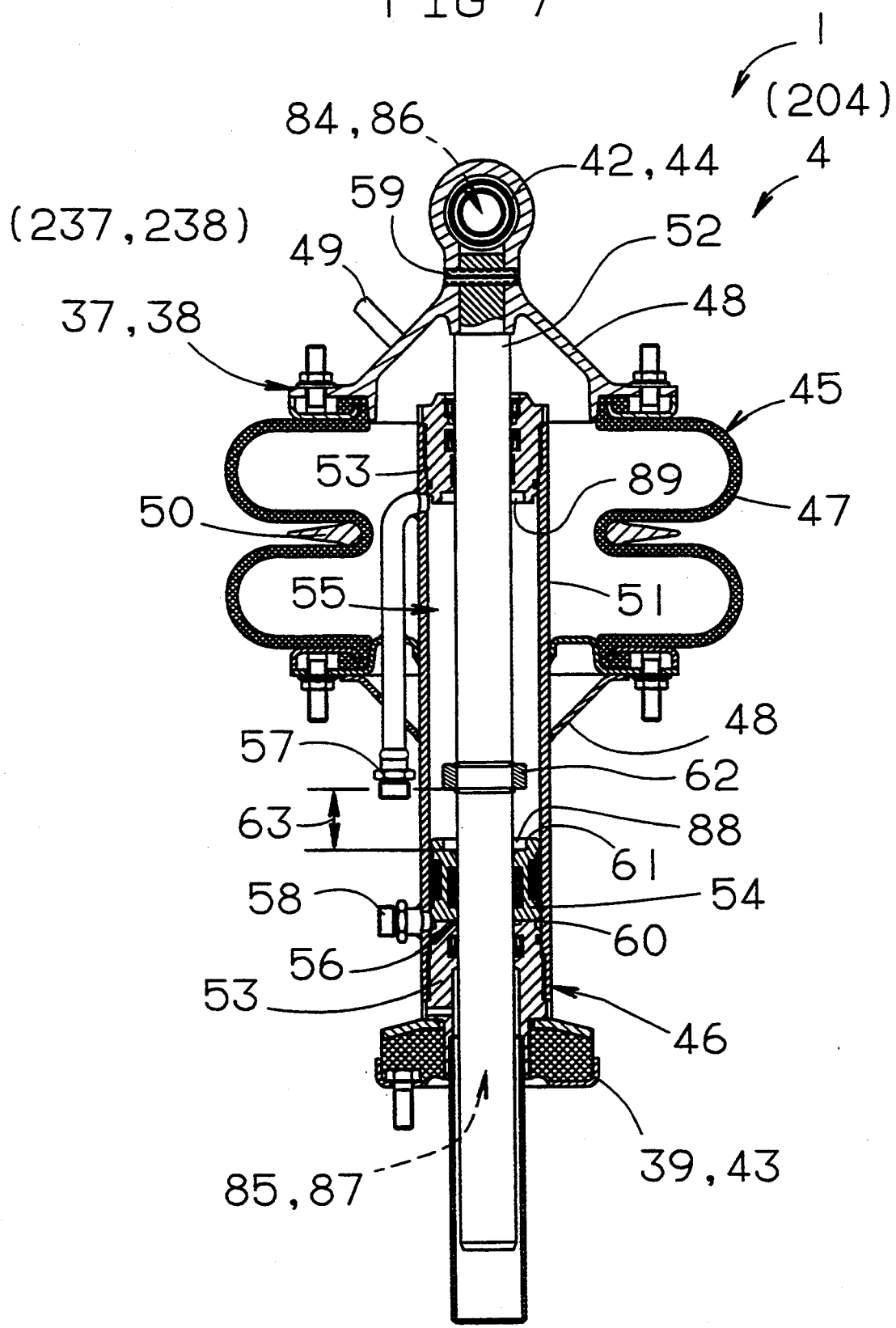
FIG. 7 represents, in section, a load-lightening and lifting element in its work position.
Figure 8:
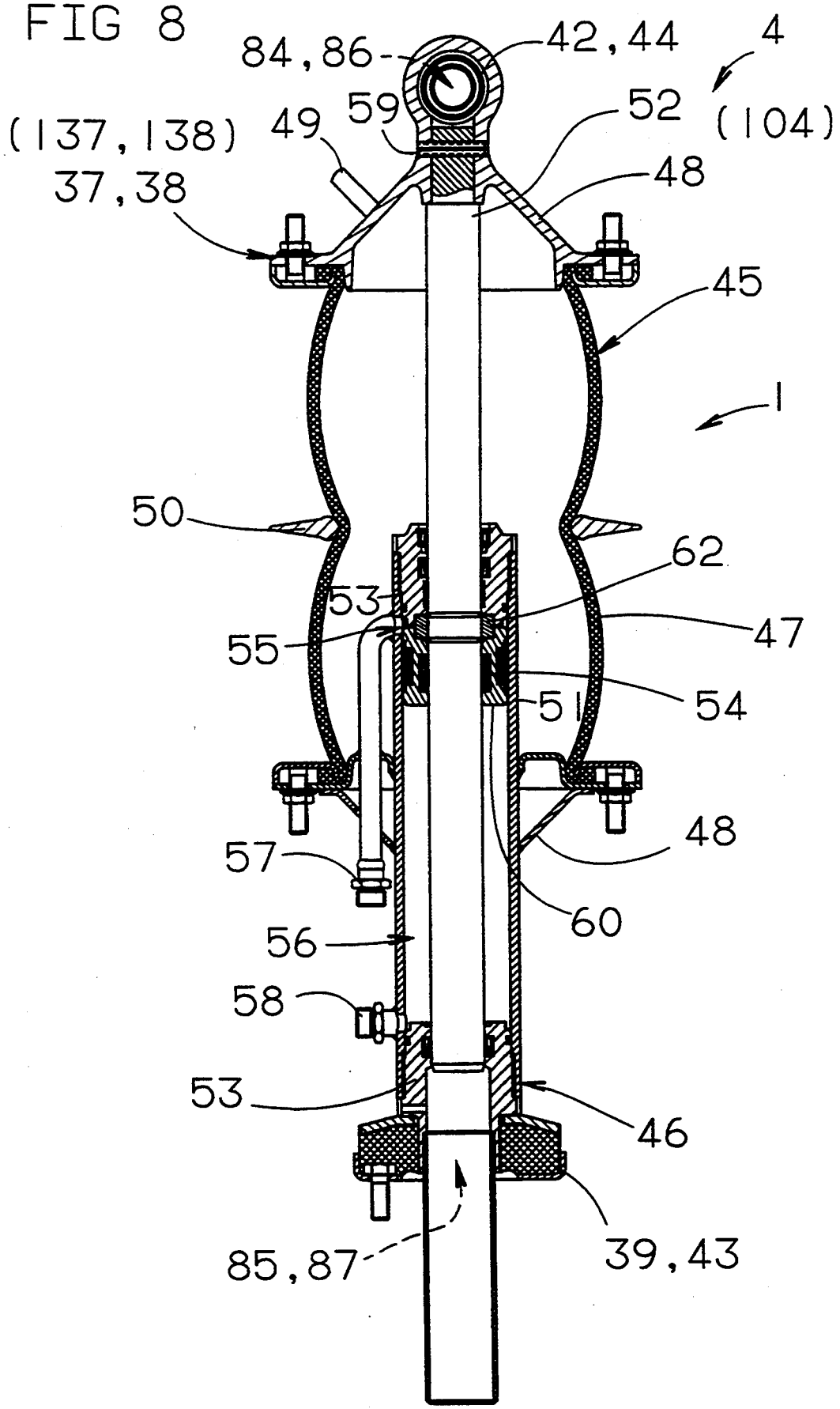
FIG. 8 represents, in section, the load-lightening and lifting element of FIG. 7 in its transport position.

In FIGS. 7 and 8, such a load-lightening and lifting element 37, 38 appears, in detail. It includes a gas spring 45 which is used to lighten harvesting mechanism 15, mounted parallel with a lifting jack or lifting cylinder 46, which makes it possible to lift the harvesting mechanism 15 when the user desires. Gas spring 45 comprises a deformable jacket or sleeve 47 under pressure and two flanges 48 each connected to a corresponding longitudinal end of the deformable jacket 47. Gas spring 45 contains a gas which can be brought to the desired pressure through a valve 49 installed on one of flanges 48. By inflating, more or less, deformable jacket 47 through valve 49, the user has the ability to adapt the stiffness of gas spring 45 to the work conditions encountered.

Advantageously, gas spring 45 contains air, which makes it possible for the user to easily inflate deformable jacket 47 by a simple air pump. Further, to limit the lateral deformation of deformable jacket 47 and to force it to a greater longitudinal deformation, deformable jacket 47 is surrounded by a lateral stiffening element 50.

Lifting jack 46 comprises, in particular, a cylinder 51 and a rod 52. Rod 52 is fastened to upper flange 48 of gas spring 45 by a pin 59, while cylinder 51 is connected rigidly to lower flange 48 of the gas spring 45. At each of its ends, cylinder 51 is equipped with a fluidtight guide ring 53 making it possible for rod 52 to extend out from both sides of cylinder 51. During work, when gas spring 45 is lengthened and shortened under the action of the displacement in height of harvesting mechanism 15, two flanges 48 of gas spring 45 draw near and move away from one another while rod 52 slides in cylinder 51. Since no element interferes with the displacement of rod 52 in cylinder 51, the harvesting mechanism 15 can easily be lightened during work.

To lift harvesting mechanism 15 utilizing lifting jack 46, a piston 54 is provided to lengthen the lifting jack 46. Piston 54 is mounted to slide on rod 52 and separates cylinder 51 into two distinct chambers 55, 56, each fed through a respective duct 57, 58. During work, first chamber 56 of cylinder 51 is empty and lower face 60 of piston 54 rests, under the action of the fluid contained in second chamber 55, against lower guide ring 53. Furthermore, an upper face 61 of piston 54 is intended to rest against a collar 62 installed slightly higher on rod 52 of lifting jack 46. Since, during work, an operational play 63 exists between upper face 61 of piston 54 and collar 62 of rod 52, piston 54 does not interfere with the operation of gas spring 45. However, when the user desires to lift harvesting mechanism 15, he feeds first chamber 56 of cylinder 51, which has the effect of translating piston 54 upward. From the moment piston 54 begins to push collar 62 of rod 52 upward, the lifting jack 46 and gas spring 45 are lengthened. By so doing, piston 54 and rod 52 are translated until piston 54 arrives at the end of its travel. In its lifted position, harvesting mechanism 15 extends at least approximately parallel above the ground and the action of gas springs 45 is cancelled (FIG. 8). Other features and advantages of load-lightening and lifting elements 37, 38 are further described below.

The driving of harvesting mechanism 15 is performed from the power take-off not shown of tractor 2, which drives, by a telescopic shaft with universal joints 64, a torque limiter 65 mounted on input shaft 66 of a movement transmission device 67 (FIG. 3). Transmission device 67 includes a lower housing 68 integral with hitching structure 3 and an upper housing 69 integral with hitching head 19. Input shaft 66 of lower housing 68 of movement transmission device 67 drives, by a first pair of bevel gears 70, an intermediate shaft 71 whose axis of rotation is merged with geometric axis 7A, and which drives, by a second pair of bevel gears 72, output shaft 73 of upper housing 69. The latter drives, by another telescopic shaft with universal joints 74 (FIGS. 1, 4 and 5), the input shaft (not shown) of input housing 35 of harvesting mechanism 15. To reduce the angle of operation of the universal joints of this telescopic shaft 74, output shaft 73 of upper housing 69 extends, during normal work, at least approximately at the same level as the input shaft (not shown) of input housing 35 of harvesting mechanism 15.

Figure 6:
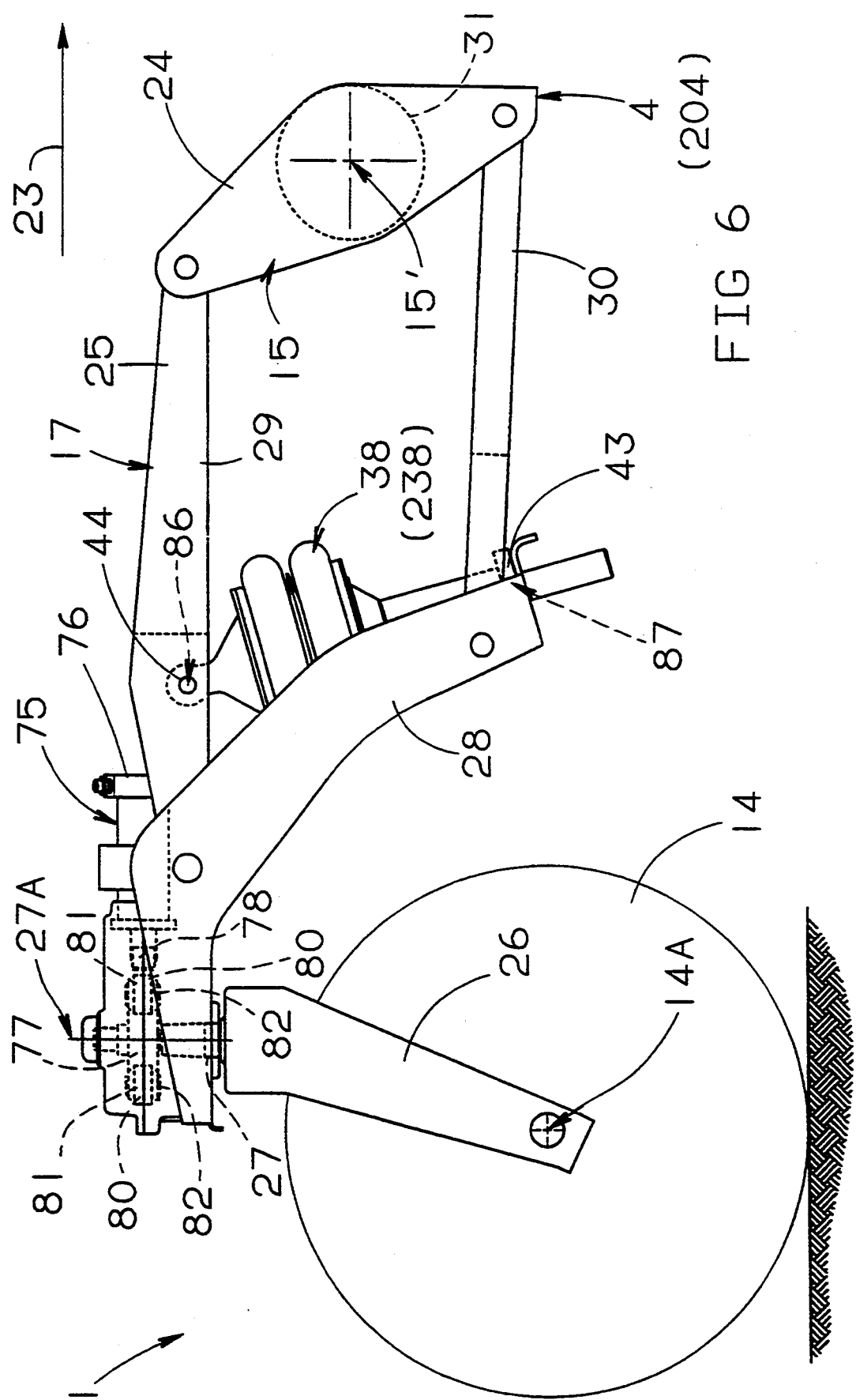
FIG. 6 represents a side view of the farm machine without protective elements, along arrow VI defined in FIG. 1.

For transport, the pivoting of element 26 for guiding wheel 14 can be blocked by a locking device 75 (FIG. 1, 4 and 6). Locking device 75 includes, in particular, a positioning cylinder 76 fastened to bracket 28 of deformable quadrilateral 25 and a lever 77 connected rigidly to element 26 for guiding wheel 14. During work, positioning cylinder 76 does not act on the lever 77, which makes it possible for wheel 14 to be oriented automatically around geometric axis 27A as a function of its displacement. On the other hand, for transport, positioning cylinder 76 acts on lever 77 by an orientation element 78, so as to orient wheel 14 in the direction of transport 79 and to hold the wheel 14 in its transport position (FIG. 4). For this purpose, lever 77 exhibits two stops 80 extending on both sides of geometric axis 27A, which stops are each made in the shape of a roller 81. Due to the fact that each roller 81 is, in addition, mounted to pivot around a pin 82 directed at least approximately vertically, the orientation and the locking of wheel 14 is performed easily.

The mower 1 according to the invention operates as follows:

During transport (FIGS. 3, 4 and 8), actuating cylinder 8 allows the pivoting of body 4 around geometric axis 7A, while wheel 14 is oriented in the direction of transport 79. The two lifting jacks 46 hold harvesting mechanism 15 at least approximately parallel above the ground. Since body 4 of mower 1 extends at least approximately in the path of tractor 2, the handling operations during transport are facilitated. In addition, only a small space is necessary for storage.

To bring body 4 of mower 1 from its transport position 104 into its work position 204, the pivoting of wheel 14 around geometric axis 27A is allowed by positioning cylinder 76 and body 4 is pivoted into its work position 204 under the action of actuating cylinder 8. Considering that body 4 rests on the ground, both in its transport position 104 and in its work position 204 by at least one wheel 14, the tractor maintains good stability. Furthermore, as a result of the improved movement transmission device 67, harvesting mechanism 15 is able to be driven in all the positions in which it can be pivoted around geometric axis 7A.

During work (FIGS. 1, 2, 5, 6 and 7), actuating cylinder 8 blocks the pivoting of body 4 around geometric axis 7A while wheel 14 is able to pivot around geometric axis 27A. The action of lifting jack 46 is eliminated so as to make it possible for harvesting mechanism 15 to adapt to the contour of the ground. In addition, since each longitudinal end 18, 24 is lightened, the harvesting mechanism 15 easily passes above the obstacles which the contour of the ground can present.

Load-lightening and lifting elements 37, 38 of this mower 1 according to the invention also exhibit the following advantages.

By virtue of the fact that a gas spring 45 is installed on lifting jack 46 in an at least approximately coaxial manner, load-lightening and lifting elements 37, 38 are particularly compact and include only two mounting points 84, 85, 86, 87 (FIGS. 5 to 8).

The ability to inflate and deflate gas spring 45 is an additional advantage of this mower according to the invention. For example, it is possible to mount deflated gas springs 45 on the machine if this simplifies the mounting.

Moreover, the user can control, from tractor 2, the feeding of lifting jacks 46 by sending the oil, either into second chamber 55 or into first chamber 56 of each lifting jack 46, by the hydraulic generator (not shown) of tractor 2.

To lift harvesting mechanism 15 at least approximately horizontally, a flow divider (not shown) is provided between the hydraulic generator and first chamber 56 of lifting jacks 46.

Furthermore, as a function of the shape and dimensions of collar 62 of rod 52, the action of the oil contained in second chamber 55 of lifting jack 46 can damp the displacements in height of harvesting mechanism 15 during work. Load-lightening and lifting elements 37, 38 therefore exhibit, in addition, a damping function, mainly in a first mode of operation 237, 238, i.e., during work (FIGS. 1, 2, 5, 6 and 7). Further, piston 54 exhibits a cavity 88 (FIG. 7) which is intended to assume the shape of collar 62 of rod 52, so as to obtain a gradual contact between the piston 54 and the collar 62.

Likewise, at the end of travel, i.e., in a second mode of operation 137, 138 when harvesting mechanism 15 is lifted above the ground (FIGS. 3, 4 and 8), piston 54 brings the collar 62 against corresponding guide ring 53 which exhibits another cavity 89 (FIG. 7), intended to assume the shape of collar 62, so as to obtain a gradual contact between the collar 62 and the guide ring 53.

Figure 9:
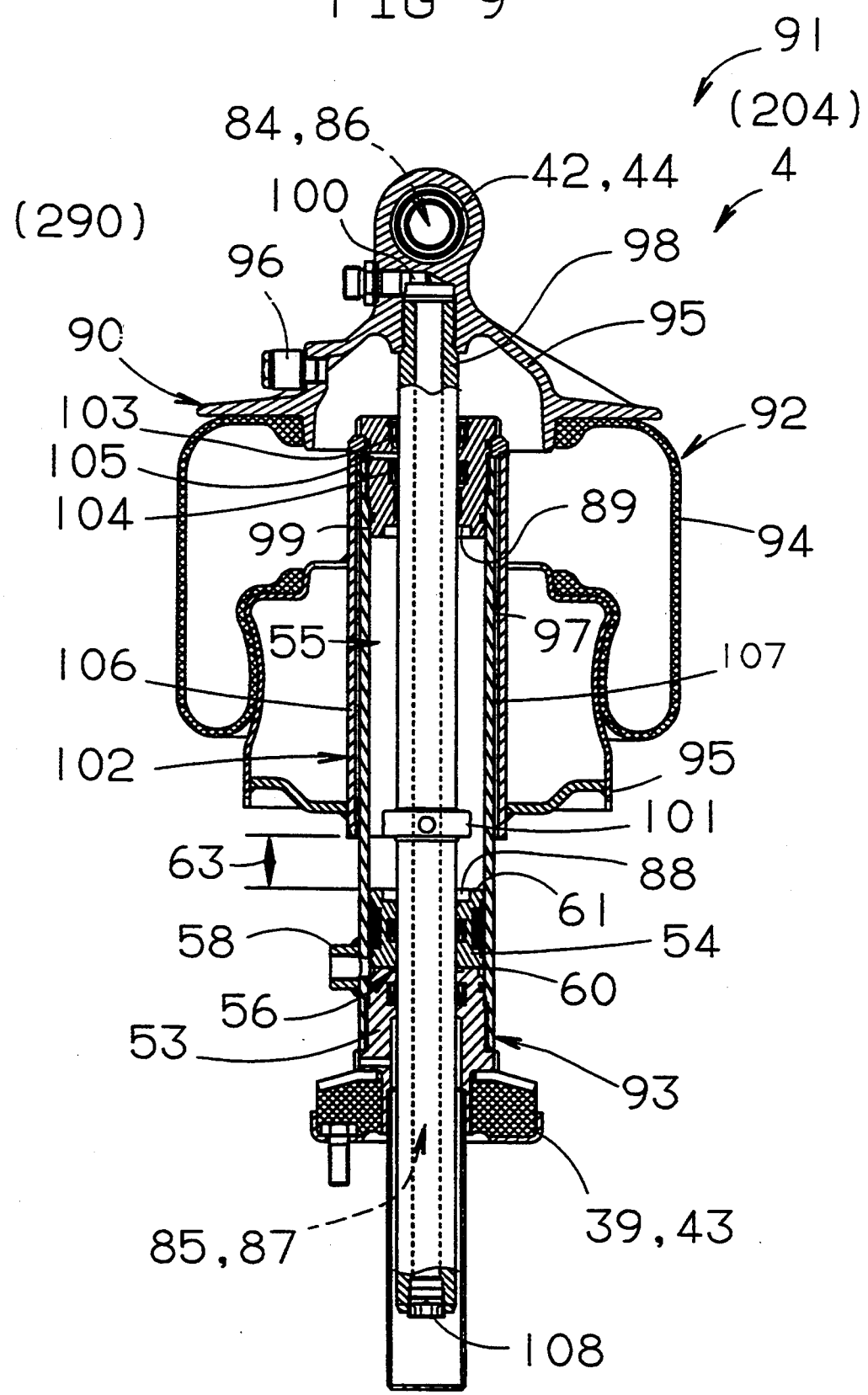
FIG. 9 represents, in section, another exemplary embodiment of a load-lightening and lifting element of a farm machine according to the invention.

In FIG. 9, another example of an embodiment of a load-lightening and lifting element 90 of a mower 91 according to the invention appears. Mower 91 includes the same characteristics as preceding mower 1, only load-lightening and lifting elements 37, 38 have each been replaced by this load-lightening and lifting element 90. In FIG. 9, load-lightening and lifting element 90 is represented in its first mode of operation 290, i.e., during work.

As in the preceding load-lightening and lifting elements 37, 38, this load-lightening and lifting element 90 comprises a gas spring 92 that is used to lighten harvesting mechanism 15, mounted parallel with a lifting jack 93 making it possible to lift the harvesting mechanism 15 when the user desires. Gas spring 92 comprises a deformable jacket 94 under pressure and two flanges 95 each connected to a corresponding longitudinal end of the deformable jacket 94 Gas spring 92 contains a gas which can be brought to the desired pressure through a valve 96 installed on one of flanges 95. By inflating, more or less, deformable jacket 94 through valve 96, the user has the ability to adapt the stiffness of gas spring 92 to the work conditions encountered. Moreover, gas spring 92 contains air, which makes it possible for the user easily to inflate deformable jacket 94 by a simple air pump.

Lifting jack or lifting cylinder 93 comprises, in particular, a cylinder 97 and a rod 98. Rod 98 is fastened to an upper flange 95 of gas spring 92, while the cylinder 97 is connected rigidly to a lower flange 95 of the gas spring 92. At each of its ends, cylinder 97 is equipped with a fluidtight guide ring 53, 99 making it possible for rod 98 to extend out from both sides of cylinder 97. During work, when gas spring 92 is lengthened and shortened under the action of the displacement in height of harvesting mechanism 15, two flanges 95 of gas spring 92 draw near and move away from one another while rod 98 slides in cylinder 97. Since no element interferes with the displacement of rod 98 in cylinder 97, harvesting mechanism 15 can easily be lightened during work.

As above, a piston 54 is also provided, which is used to lengthen the lifting jack 93. Piston 54 is mounted to slide on rod 98 and separates cylinder 97 into two distinct chambers 55, 56, each fed through a respective duct 100, 58. During work, first chamber 56 of cylinder 97 is empty and lower face 60 of piston 54 rests, under the action of the fluid contained in second chamber 55, against lower guide ring 53. Furthermore, upper face 61 of piston 54 is intended to rest against a collar 101 installed slightly higher on the rod 98 of lifting jack 93. Since, during work, an operational play 63 exists between upper face 61 of piston 54 and collar 101 of rod 98, piston 54 does not interfere with the operation of gas spring 92. However, when the user desires to lift harvesting mechanism 15, he feeds first chamber 56 of cylinder 97, which has the effect of translating piston 54 upward. From the moment piston 54 begins to push collar 101 of rod 98 upward, lifting jack 93 and gas spring 92 are lengthened. By so doing, piston 54 and rod 98 are translated until piston 54 arrives at the end of its travel. In its lifted position, harvesting mechanism 15 extends at least approximately parallel above the ground and the action of gas springs 92 is cancelled. As for features and advantages of load-lightening and lifting elements 37, 38 described above, they are also valid for this load-lightening and lifting element 90 and therefore will not be described again. The same holds true for the installation of load-lightening and lifting element 90 on mower 91.

In addition, in relation to load-lightening and lifting elements 37, 38 described above, the latter 90 includes a safety device 102, preventing oil from running the risk of leaking into gas spring 92. Taking into account the high pressure usually prevailing in this type of hydraulic circuit, a significant leakage of oil in gas spring 92 would run the risk of causing it to explode.

To avoid this risk, guide ring 99, installed between the gas and the oil, exhibits certain features. Actually, at the level of the guiding of rod 98, guide ring 99 comprises two successive seals 103, 104 between which is provided at least one orifice 105 communicating with the atmospheric pressure. As a result, if one of two seals 103, 104 should leak, the oil or the gas would escape toward the outside. Safety device 102 comprises for this purpose a safety element 106, fastened in a fluidtight manner at its upper end to the guide ring 99 and extending downward between gas spring 92 and lifting jack 93. Since between safety element 102 and cylinder 97 of lifting jack 93, a cavity 107 surrounding said cylinder 97 exists, the fluid escaping through orifice 105 can then safely downward. At its lower end, safety element 106 is also connected partially to cylinder 97.

An additional advantage of this load-lightening and lifting device 90 resides in the installation of a duct 100 which is used to feed chamber 55 in which collar 101 extends. Actually, to prevent this duct 100 from passing through lower flange 95, this duct 100 begins at the level of upper flange 95 where rod 98 is fastened in a fluidtight manner to the flange 95 and continues inside rod 98 to come out at least approximately radially at the level of collar 101. Advantageously, the duct 100 begins at the level of upper flange 95 in the vicinity of rod 98. For ease in production, rod 98 is produced from a pipe, one end of which is sealed in a fluidtight manner utilizing a bolt 108.

Obviously, various modifications are possible in view of the above teachings, particularly in regard to the make-up of the various elements or by substitution of technical equivalents, without thereby going outside the field of protection defined by the claims. For example, the jack could be mounted parallel with a helical spring or a torsion bar. It is therefore to be understood that the invention may be practiced otherwise than as specifically described herein.

What is claimed as new and desired to be secured by Letters patent of the United States is:

1. A farm machine having a body and at least one load-lightening and lifting device associated with said body and adapted, in a first mode of operation, to lighten said body, and, in a second mode of operation, to lift said body, said load-lightening and lifting device comprising a jack mounted in parallel with an elastically deformable element, said jack comprising:
   a cylinder;
   a rod guided in said cylinder and extending out from said cylinder; and
   a piston mounted to slide in said cylinder and which separates said cylinder into two distinct chambers a first one of which is intended to be fed with fluid from a feed source to translate the piston in the cylinder in order to lift the body, wherein the piston is separated from and is mounted to slide on said rod, and said rod extends entirely through the second one of said two chambers and comprises a stop against which the piston is intended to come to rest, so that:
   in said first mode of operation, the rod can slide in the cylinder without said stop of said rod touching the piston, which allows a normal operation of said elastically deformable element to lighten said body; and
   in said second mode of operation, the piston is brought into contact with said stop of the rod, under the action of the fluid of the feed source, to displace said rod in relation to the cylinder and to lift said body.

2. The farm machine according to claim 1, wherein the rod extends through the piston and extends out on both sides of the cylinder.

3. The farm machine according to claim 1, wherein the piston includes a cavity which assumes a shape of the stop of the rod to obtain a gradual contact between said piston and said stop.

4. The farm machine according to claim 1, wherein at an end of travel, the piston brings the stop of said rod against a longitudinal end of the cylinder which exhibits a cavity which assumes the shape of the stop to obtain a gradual contact between the stop and said cylinder.

5. The farm machine according to claim 1, wherein said jack is a double-action jack whose two chambers are fed with fluid from said feed source.

6. The farm machine according to claim 1, wherein said stop is a collar having a shape and dimensions which dampen sliding of the rod in the cylinder.

7. The farm machine according to claim 1, wherein said elastically deformable element is a compression spring.

8. The farm machine according to claim 1, wherein said elastically deformable element comprises a gas spring.

9. The farm machine according to claim 8, wherein said gas spring comprises an elastically deformable jacket and two flanges each provided at a longitudinal end of said elastically deformable jacket.

10. The farm machine according to claim 8, wherein said gas spring comprises an elastically deformable jacket and wherein said gas spring further comprises a lateral stiffening element which surrounds said elastically deformable jacket.

11. The farm machine according to claim 8, wherein said gas spring comprises a valve through which said gas spring can be inflated to a desired pressure.

12. The farm machine according to claim 8, wherein said gas spring is an air spring.

13. The farm machine according to claim 1, wherein the elastically deformable element is installed between the rod and the cylinder of the jack.

14. The farm machine according to claim 13, wherein:
   a) the elastically deformable element is a gas spring comprising an elastically deformable jacket and two flanges each provided at a longitudinal end of said elastically deformable jacket; and 15. The farm machine according to claim 14, wherein the load-lightening and lifting device comprises a safety device preventing the fluid fed from the feed source from leaking into the gas spring.

16. The farm machine according to claim 15, wherein the load-lightening and lifting device comprises a guide ring of said rod, said guide ring being installed between the fluid of the feed source and the gas of said gas spring, and wherein said guide ring comprises at a level of the rod two successive seals, between which an orifice is provided, thereby allowing the fluid of the feed source to escape in case of leakage from a corresponding seal.

17. The farm machine according to claim 16, wherein said orifice communicates with atmospheric pressure.

18. The farm machine according to claim 16, wherein the safety device comprises a safety element fastened in a fluidtight manner at one of its ends to the guide ring and extending between said gas spring and said jack, to evacuate the fluid in all safety.

19. The farm machine according to claim 14, wherein the feeding of the chamber of the jack, located at a level of said gas spring, is performed by a duct provided inside, rod of said jack and extending out at the level of said stop.

20. The farm machine according to claim 19, wherein said duct begins at the level of the flange to which the rod is fastened.

21. The farm machine according to claim 1, wherein said elastically deformable element is installed on the jack, in an at least approximately coaxial manner, to form a single element exhibiting only two mounting points.

22. The farm machine according to claim 21, wherein at least one of the two mounting points comprises an elastic connection.

23. The farm machine according to claim 22, wherein each one of said two mounting points comprises an elastic connection.

24. The farm machine according to claim 1, including means for connection to a power-driven vehicle and wherein said power-driven vehicle comprises said feed source.

25. The farm machine according to claim 24, wherein said farm machine is a cutting machine which further comprises a hitching structure constituting said means for connection to a hitch of said power-driven vehicle, and wherein said body comprises;
 a cutting mechanism extending, during work, crosswise to a direction of work;
 a first connection device connecting said cutting mechanism to said hitching structure, said first connection device being connected to said cutting mechanism at least approximately in the vicinity of a first longitudinal end of said cutting mechanism and allowing, during work, the pivoting of said cutting mechanism in relation to said hitching structure around a geometric axis directed forward, said first connection device also allowing displacement in height of the cutting mechanism in relation to the hitching structure;
 a wheel placed in the vicinity of a second longitudinal end of said cutting mechanism and which rolls over the ground during work, while being able to pivot around a geometric axis directed upward;
 a second connection device connecting said wheel to said cutting mechanism, said second connection device being connected to the cutting mechanism at least approximately in the vicinity of said second longitudinal end of said cutting mechanism and allowing a displacement in height of said cutting mechanism in relation to said wheel; and
 two load-lightening and lifting devices, each associated with a respective one of said first and second connection devices, so that in said first mode of operation, namely during work, the cutting mechanism is lightened and in said second mode of operation said cutting mechanism extends at least approximately parallel above the ground.

26. The farm machine according to claim 1, wherein said farm machine is a mower with or without elements for processing a cut product.

27. A farm machine having a body and at least one load-lightening and lifting device associated with said body and adapted, in a first mode of operation, to lighten said body, and, in a second mode of operation, to lift said body, said load-lightening and lifting device comprising a jack mounted in parallel with an elastically deformable element, said jack comprising:
 a cylinder;
 a rod guided in said cylinder and extending out from said cylinder; and
 a piston mounted to slide in said cylinder and which separates said cylinder into two distinct chambers, at least one of which is intended to be fed with fluid from a feed source, to translate the piston in the cylinder, wherein the piston is separated from the rod of the jack, and wherein said rod extends through the piston and extends out on both sides of the cylinder, said rod further comprises a stop against which the piston is intended to come to rest, so that:
 in said first mode of operation, the rod can slide in the cylinder without said stop of said rod touching the piston, which allows a normal operation of said elastically deformable element; and
 in said second mode of operation, the piston is brought into contact with said stop of the rod, under the action of the fluid of the feed source, to displace said rod in relation to the cylinder.

28. The farm machine according to claim 27, wherein the piston includes a cavity which assumes a shape of the stop of the rod to obtain a gradual contact between said piston and said stop.

29. The farm machine according to claim 27, wherein at an end of travel, the piston brings the stop of said rod against a longitudinal end of the cylinder which exhibits a cavity which assumes the shape of the stop to obtain a gradual contact between the stop and said cylinder.

30. The farm machine according to claim 27, wherein said jack is a double-action jack whose two chambers are fed with fluid from said feed source.

31. The farm machine according to claim 27, wherein said stop is a collar having a shape and dimensions which dampen sliding of the rod in the cylinder.

32. The farm machine according to claim 27, wherein said elastically deformable element is a compression spring.

33. The farm machine according to claim 27, wherein said elastically deformable element comprises a gas spring.

34. The farm machine according to claim 33, wherein said gas spring comprises an elastically deformable jacket and two flanges each provided at a longitudinal end of said elastically deformable jacket.

35. The farm machine according to claim 33, wherein said gas spring comprises an elastically deformable jacket and wherein said gas spring further comprises a lateral stiffening element which surrounds said elastically deformable jacket.

36. The farm machine according to claim 33, wherein said gas spring comprises a valve through which said gas spring can be inflated to a desired pressure.

37. The farm machine according to claim 33, wherein said gas spring is an air spring.

38. The farm machine according to claim 27, wherein the elastically deformable element is installed between the rod and the cylinder of the jack.

39. The farm machine according to claim 38, wherein:
 the elastically deformable element is a gas spring comprising an elastically deformable jacket and two flanges each provided at a longitudinal end of said elastically deformable jacket; and
 b) one of said two flanges is connected to said rod and the other to said cylinder.

40. The farm machine according to claim 39, wherein the load-lightening and lifting device comprises a safety device preventing the fluid fed from the feed source from leaking into the gas spring.

41. The farm machine according to claim 40, wherein the load-lightening and lifting device comprises a guide ring of said rod, said guide ring being installed between the fluid of the feed source and the gas of said gas spring, and wherein said guide ring comprises at a level of the rod two successive seals, between which an orifice is provided, thereby allowing the fluid of the feed source to escape in case of leakage from a corresponding seal.

42. The farm machine according to claim 41, wherein said orifice communicates with atmospheric pressure.

43. The farm machine according to claim 41, wherein the safety device comprises a safety element fastened in a fluidtight manner at one of its ends to the guide ring and extending between said gas spring and said jack, to evacuate the fluid in all safety.

44. The farm machine according to claim 39, wherein the feeding of the chamber of the jack, located at a level of said gas spring, is performed by a duct provided inside the rod of said jack and extending out at the level of said stop.

45. The farm machine according to claim 44, wherein said duct begins at the level of the flange to which the rod is fastened.

46. The farm machine according to claim 27, wherein said elastically deformable element is installed on the jack, in an at least approximately coaxial manner, to form a single element exhibiting only two mounting points.

47. The farm machine according to claim 46, wherein at least one of the two mounting points comprises an elastic connection.

48. The farm machine according to claim 47, wherein each one of said two mounting points comprises an elastic connection.

49. The farm machine according to claim 27, including means for connection to a power-driven vehicle and wherein said power-driven vehicle comprises said feed source.

50. The farm machine according to claim 49, wherein said farm machine is a cutting machine which further comprises a hitching structure constituting said means for connection to a hitch of said power-driven vehicle, and wherein said body comprises:
  a cutting mechanism extending, during work, crosswise to a direction of work;
  a first connection device connecting said cutting mechanism to said hitching structure, said first connection device being connected to said cutting mechanism at least approximately in the vicinity of a first longitudinal end of said cutting mechanism and allowing, during work, the pivoting of said cutting mechanism in relation to said hitching structure around a geometric axis directed forward, said first connection device also allowing displacement in height of the cutting mechanism in relation to the hitching structure;
  a wheel placed in the vicinity of a second longitudinal end of said cutting mechanism and which rolls over the ground during work, while being able to pivot around a geometric axis directed upward;
  a second connection device connecting said wheel to said cutting mechanism, said second connection device being connected to the cutting mechanism at least approximately in the vicinity of said second longitudinal end of said cutting mechanism and allowing a displacement in height of said cutting mechanism in relation to said wheel; and
  two load-lightening and lifting devices, each associated with a respective one of said first and second connection devices, so that in said first mode of operation, namely during work, the cutting mechanism is lightened and in said second mode of operation said cutting mechanism extends at least approximately parallel above the ground.

51. The farm machine according to claim 27, wherein said farm machine is a mower with or without elements for processing a cut product.

* * * * *

UNITED STATES PATENT AND TRADEMARK OFFICE
CERTIFICATE OF CORRECTION

PATENT NO. : 5,417,042
DATED : May 23, 1995
INVENTOR(S) : MARTIN WALCH, ET AL

It is certified that error appears in the above-indentified patent and that said Letters Patent is hereby corrected as shown below:

Col. 12, after line $^{43}$, insert the following paragraph --b) one of said two flanges is connected to said rod and the other to said cylinder.--

Col. 12, line 66, replace "," with --the--.

Signed and Sealed this

Twenty-sixth Day of September, 1995

*Attest:*

BRUCE LEHMAN

*Attesting Officer*  *Commissioner of Patents and Trademarks*